(12) United States Patent  
Aso

(10) Patent No.: US 7,204,414 B2
(45) Date of Patent: Apr. 17, 2007

(54) IMAGE GENERATION SYSTEM AND CONTACTLESS COMMUNICATION MEDIUM, METHOD FOR SELLING COMMODITIES, AND COMPLEX STORE

(75) Inventor: Satoshi Aso, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 11/089,453

(22) Filed: Mar. 23, 2005

(65) Prior Publication Data

US 2005/0211774 A1   Sep. 29, 2005

(30) Foreign Application Priority Data

Mar. 25, 2004  (JP)  ............... 2004-089470

(51) Int. Cl.
   *G06K 5/00*   (2006.01)
(52) U.S. Cl. .................... 235/380; 235/375
(58) Field of Classification Search ........... 235/380, 235/383, 375, 385, 487
   See application file for complete search history.

(56) References Cited

U.S. PATENT DOCUMENTS 5,848,399 A * 12/1998 Burke .................... 705/27

2004/0079797 A1 * 4/2004 Wadley ................. 235/375
2005/0109846 A1 * 5/2005 Lubow ................ 235/462.01

FOREIGN PATENT DOCUMENTS

JP      2001-283085     10/2001

* cited by examiner

*Primary Examiner*—Daniel St. Cyr
*Assistant Examiner*—Edwyn Labaze
(74) *Attorney, Agent, or Firm*—Hogan & Hartson LLP

(57) ABSTRACT

An image generation system and contactless communication media, a method for selling commodities, and a complex store provide that the purchase of commodities can be considered based on actual commodities offered at shops and images including the use state of the commodities. The system includes a tag corresponding to a commodity, a portable terminal and an image generation device. The tag stores image information of the commodity, and transmits the image information to the portable terminal when the portable terminal approaches. The portable terminal receives the image information and outputs the received image information to an image generation device. The image generation device generates an image including the use state of the commodity based on the image information of the commodity outputted from the portable terminal, displays the image including the use state of the commodity generated.

13 Claims, 7 Drawing Sheets

IMAGE GENERATION SYSTEM AND CONTACTLESS COMMUNICATION MEDIUM, METHOD FOR SELLING COMMODITIES, AND COMPLEX STORE

BACKGROUND OF THE INVENTION

1. Field of the Invention

The present invention relates to image generation systems and contactless communication mediums, as well as methods for selling commodities, and complex stores, which enable each customer to readily confirm if, for example, a hair style, a make-up, a dress, an accessory (jewelry), a bag, a pair of shoes, and the like in a store "fits to the customer" or "can be consistently combined," while the customer is actually looking at them in the store.

2. Description of Related Art

Conventionally, on the side where services and articles (hereafter, referred to as "commodity") concerning the beauty culture such as hair styles, make-ups, dresses, accessories jewelry), bags, shoes and the like are offered, the user's selection of the commodity tends to be controlled by advices from advisors, and the consumer might not necessarily be able to select one of her/his preference. However, the aforementioned commodity is personally related to the consumers' own sensibility and preference, and therefore it is necessary that such commodity is offered according to the consumers' own demand.

To meet such a demand, there has been proposed a system "that attains an object concerning the user's request and then attains an image of private information that is the user her/himself, attains user's own data while adjusting the size and direction according to the shape of the item according to the user's request, and creates a two-dimensional or three-dimensional synthesized image by superposing the data, thereby enabling the user to enjoy the feeling of an actual try-on based on the image." See, for example, Japanese Laid-open patent 2001-283085. Synthesized images of this system can be used in a variety of applications, such as, advices from advisors, comparison with talents' hair styles, and the like.

It is noted that the system described above is a system that requires so-called virtual shops, and pertains to that helps customers who want articles and/or services to recognize the states of the articles and/or services that are close to the actual states thereof in use as much as possible, when the customers select the articles and/or services from places (home, etc.) different from shops of the real world. Therefore, there is no concept of making the actual articles and/or services appear in the system, and therefore it is implicitly assumed that the customers confirm the actual articles or the like after their purchase or when the customers go to the shops. However, according to an actual human sequence of selecting articles and/or services, a consumer ordinarily goes to a shop and confirms actual articles and/or services. Therefore, the system described above is different from the actual human selection sequence when selecting articles and/or services.

SUMMARY OF THE INVENTION

The present invention has been made in view of the circumstances described above, and it is an object of the present invention to provide image generation systems and contactless communication mediums with which the purchase of commodities can be considered based on actual commodities offered at shops and images of the commodities in the use state, as well as methods for selling commodities and complex type stores.

To achieve the objects described above, a first aspect of the invention pertains to an image generation system that generates an image including a use state of at least one commodity offered at a shop, and comprises a contactless communication medium corresponding to the commodity, a data communications device and an image generation device, wherein the contactless communication medium is equipped with image information storage means for storing image information of the commodity, and image information transmission means for transmitting the image information of the commodity to the data communications device when the data communications device approaches. The data communications device is equipped with image information reception means for receiving the image information of the commodity transmitted from the contactless communication medium, and image information output means for outputting the received image information of the commodity to the image generation device. The image generation device is equipped with image generation means for generating an image including the use state of the commodity based on the image information of the commodity outputted from the data communications device, and image display means for displaying the image including the use state of the commodity generated.

According to the first aspect of the invention described above, the contactless communication medium can store image information of the commodity with the image information storage means, and can transmit the image information of the commodity, with the image information transmission means, to the data communications device when the data communications device approaches. Also, the data communications device can receive, with the image information reception means, the image information of the commodity transmitted from the contactless communication medium, can output, with the image information output means, the received image information of the commodity to the image generation device. Further, the image generation device can generate, with the image generation means, an image including the use state of the commodity based on the image information of the commodity outputted from the data communications device, can display, with the image display means, the generated image including the use state of the commodity.

It is noted that the commodity in the present invention includes both articles and services. For example, dresses, accessories (jewelry), bags, shoes and the like are enumerated as the articles. Also, services concerning hair styles, make-ups, and the like are enumerated as the services. Further, the "contactless communication medium corresponding to the commodity" in the present invention means a "contactless communication medium that is directly or indirectly provided on a commodity." The state of "indirectly providing on a commodity" means, when the commodity is an accessory, a state of "being attached to a storage case of the accessory," a state of "being attached to a price tag of the accessory" or the like. When the commodity is a service such as a nail make-up service, it is a state of "being attached to a storage case of nail models." The nail models carry nail make-ups which are a commodity.

According to the first aspect of the invention, a person who is planning to purchase a commodity (hereafter referred to as a "customer") can actually see and/or touch by hand a plurality of commodities offered at a shop, and can obtain only image information of preferred commodities from among them. Then, the customer can consider the purchase of commodities based on the actual commodities offered at the shop and images including the use state of the commodities.

It is noted that the contactless communication mediums may be, for example, contactless identification tags. The contactless identification tags are used in an RFID (Radio Frequency IDentification) system, and are also generally called data carriers. They can be in a variety of configurations, such as, a label shape, card shape, coin shape, stick shape and the like. These configurations have close relation to their applications. For example, those carried by people may be in a key holder shape that is modified from a card shape or a label shape. Also, those used as carrier IDs for semiconductor devices are dominantly in a stick shape. Also, those that are sewed to clothes of linen are dominantly in a coin shape. Furthermore, some of those in a card shape may be equipped with a display section.

Also, a contactless identification tag may be equipped with a storage region that is dedicated for reading data, or where data can be freely read and written, and can be operated by contactless power transmission from an antenna side without a battery. Also, the RFID system is an ID system that uses radio waves or electromagnetic waves as a medium, in which the contactless identification tag has three characteristics: (1) it has the size that is readily carried, (2) it stores information in an electronic circuit, and (3) it communicates in a contactless communication. Accordingly, the RFID system is used for the purpose of unifying people, items, vehicles and the like carrying contactless identification tags with their information. In other words, where there are people, items and vehicles, required information can be retrieved at any time, and new information can be written as necessary.

Also, there are four representative kinds of the RFID system, i.e., an inductive coupling system, an electromagnetic induction system, a microwave system, and an optical system. The inductive coupling system communicates with the contactless identification tags, primarily using mutual induction of coils by alternating magnetic field. The electromagnetic induction system communicates with the contactless identification tags, primarily using electromagnetic waves in a long or medium wavelength range that is a 250 kHz or below, or a 13.56 MHz band. The microwave system performs data communications between the antenna of a reader/writer device and the contactless identification tags with microwave in a 2.45 GHz band. The optical system is provided with an LED as a light generation source and a phototransistor or the like as a photodetector to communicate with the contactless identification tags using spatial transmission of light.

Also, there are mainly four access modes, including a single access mode, a FIFO (First In First Out) access mode, a multiple access mode, and a selective access mode. In the single access mode, one contactless identification tag can be present in an antenna communication range, and no communication can be established as a communication error occurs if multiple contactless identification tags are present in the antenna communication range.

In the FIFO access mode, communications can be established sequentially with contactless identification tags in the order that they enter an antenna communication range. An access prohibiting process is conducted on those of the contactless identification tags when they complete communications. Accordingly, even when multiple contactless identification tags that have completed communications are present within the antenna communication range, communications can be established with a new contactless identification tag that enters the antenna communication range. If multiple contactless identification tags simultaneously enter the communication range, a communication error takes place, and communications cannot be established. Those of the contactless communication tags whose accesses are prohibited become communicatable once they are out of the communication range.

In the multiple access mode, even when multiple contactless identification tags are present in an antenna communication range, communications can be established with all of the contactless identification tags. According to the selective access mode, among multiple contactless identification tags that are present in a communication range, communications can be established with specified ones of the contactless identification tags, which is realized by a command for allocating numbers to the contactless identification tags within the communication range, and a command for establishing communications with specified ones of the contactless identification tags based on the allocated numbers.

It is noted that, when contactless identification tags of a single access mode are applied to contactless communication mediums of the present invention, the communication range of the contactless identification tag may be narrowed, such that communication errors by collision of other contactless identification tags can be prevented.

A second aspect of the invention pertains to an image generation system that generates an image including a use state of at least one commodity offered at a shop, and is characterized in comprising: a contactless communication medium corresponding to the commodity, a data communications device and an image generation device connected to a specified data base. The contactless communication medium is equipped with identification information storage means for storing identification information of the commodity, and identification information transmission means for transmitting the identification information of the commodity to the data communications device when the data communications device approaches. The data communications device is equipped with identification information reception means for receiving the identification information of the commodity transmitted from the contactless communication medium, and identification information output means for outputting the received identification information of the commodity to the image generation device. The image generation device is equipped with image information obtaining means for obtaining image information of the commodity from the data base based on the identification information of the commodity outputted from the data communications device, image generation means for generating an image including the use state of the commodity based on the image information of the commodity obtained, and image display means for displaying the image including the use state of the commodity generated.

According to the second aspect of the invention, the contactless communication medium can store, with the identification information storage means, identification information of the commodity, and can transmit, with the identification information transmission means, the identification information of the commodity to the data communications device when the data communications device approaches. Further, the data communications device can receive, with the identification information reception means, the identification information of the commodity transmitted from the contactless communication medium, and can output, with the identification information output means, the received identification information of the commodity to the image generation device.

Furthermore, the image generation device can obtain, with the image information obtaining means, image information of the commodity from the data base based on the identification information of the commodity outputted from the data communications device. Also, the image generation means can generate an image including the use state of the commodity based on the image information of the commodity obtained, and the image display means can display the image including the use state of the commodity generated.

It is noted here that the specified data base is, for example, a network server that is connected to the image generation device through a communication line, or an optical disk or the like that is readable with the image generation device. An optical disk may be in a state that stores image information of commodities, and is assumed to be distributed with charge or free of charge from a shop or the like who sells commodities.

According to the second aspect of the invention, a customer can actually see and/or touch by hand a plurality of commodities offered at a shop, and can obtain image information of only preferred commodities from among them. Then, the customer can consider the purchase of a commodity based on the actual commodities offered at the shop and images including the use state of the commodities. Compared to the first aspect of the invention, the amount of information to be stored in the contactless communication medium can be reduced, and therefore the time required for transmitting information between the contactless communication medium and the data communications device can be shortened.

A third aspect of the invention pertains to an image generation system that generates an image including a use state of at least one commodity offered at a shop, and is characterized in comprising: a contactless communication medium corresponding to the commodity, a data communications device and an image generation device connected to a specified data base The contactless communication medium is equipped with identification information storage means for storing identification information of the commodity, and image information transmission means for transmitting the identification information of the commodity to the data communications device when the data communications device approaches. The data communications device is equipped with identification information reception means for receiving the identification information of the commodity transmitted from the contactless communication medium, image information obtaining means for obtaining image information of the commodity from the data base based on the received identification information of the commodity, and image information output means for outputting the obtained image information of the commodity to the image generation device. The image generation device is equipped with image generation means for generating an image including the use state of the commodity based on the image information of the commodity outputted from the data communications device, and image display means for displaying the image including the use state of the commodity generated.

According to the third aspect of the invention, the contactless communication medium can store, with the identification information storage means, identification information of the commodity, and can transmit, with the image information transmission means, the identification information of the commodity to the data communications device when the data communications device approaches. Also, the data communications device can receive, with the identification information reception means, the identification information of the commodity transmitted from the contactless communication medium, can obtain, with the image information obtaining means, image information of the commodity from the data base based on the received identification information of the commodity, and can output, with the image information output means, the obtained image information of the commodity to the image generation device. Moreover, the image generation device can generated, with the image generation means, an image including the use state of the commodity based on the image information of the commodity outputted from the data communications device, and can display, with the image display means, the image including the use state of the commodity generated.

According to the third aspect of the invention, a customer can obtain only image information of preferred commodities from among a plurality of commodities offered at a shop, as in the first and second aspects of the invention. Then, the customer can consider the purchase of a commodity based on the actual commodities offered at the shop and images including the use state of the commodities. Compared to the first aspect, the amount of information to be stored in the contactless communication medium can be reduced, and therefore the time required for transmitting information between the contactless communication medium and the data communications device can be shortened.

A fourth aspect of the invention is characterized in that, in the image generation system according to the preceding three aspects of the invention, the image generation means generates the image including the use state of the commodity based on the image information of the commodity, and image information of an application object to which the commodity is actually applied. According to the fourth aspect, the image generation means can generate the image including the use state of the commodity based on the image information of the commodity outputted from the data communications device, and image information of an application object to which the commodity is actually applied.

It is noted here that, when the commodities are articles such as dresses, accessories (jewelry), bags, shoes and the like, and/or beauty services such as hair styling, make-ups, and the like, the application object to which the commodity is actually applied is a person who wares the dresses. Also, when the commodities are, for example, pieces of furniture, the application object is a house or the like in which the pieces of furniture are placed.

A fifth aspect of the invention is characterized in that, in the image generation system of the fourth aspect, the data communications device is equipped with application object image information storage means for storing image information of an application object to which the commodity is actually applied, and application object image output means for outputting the image information of the application object. According to the fifth aspect, the application object image information storage means can store image information of an application object to which the commodity is actually applied, and the application object image output means can output the image information of the application object.

According to the fourth and fifth aspects of the image generation system, compared to the first through third aspects of the image generation system, an image including a use state of the commodity can be brought closer to the actual state. For example, when the commodities are a shirt and a pair of trousers, the image generation means attains image information of the shirt and the pair of trousers, and image information concerning personal appearance such as the customer's face, height, lines of the body and the like, and generates a synthesized image showing the customer trying on the shirt and the pair of trousers. According to such a structure, the customer can image her appearance when she herself tries on a shirt and a pair of trousers of her preference with a stronger sense of reality, and can judge more objectively whether the dress suits her.

Also, for example, when the commodities are a piece of furniture, the image generation means attains image information of the furniture, and image information concerning a room of the customer where he wants to place the furniture, and generates a synthesized image indicating when the further is placed in the room. According to such a structure, the customer can image a state in which the furniture of his preference is placed in his own room with a stronger sense of reality. Also, without separately comparing the size of his room with the size of each piece of furniture, it can be readily judged from synthesized images as to whether the furniture can be stored in his own room.

Further, a sixth aspect of the invention is characterized in that, in the image generation system of the fifth aspect, the data communications device is equipped with application object image information obtaining means for obtaining image information of an application object to which the commodity is actually applied. According to the sixth aspect, the application object image information obtaining means can obtain image information of an application object to which the commodity is actually applied. It is noted here that the application object image information obtaining means may be, for example, an imaging device such as a CCD camera, a CMOS sensor, or the like.

According to the the sixth aspect of the invention, for example, an image of a person can be taken by a CMOS sensor or the like mounted in a data communications device, such that private information such as her/his own appearance and the like can be directly inputted in the data communications device.

Furthermore, a seventh aspect of the invention is characterized in that, in the image generation system of any one of the preceding six aspects, the contactless communication medium is equipped with character information storage means for storing character information concerning the commodity, and character information transmission means for transmitting the character information concerning the commodity to the data communications device when the data communications device approaches, and the data communications device is equipped with character information reception means for receiving the character information concerning the commodity transmitted from the contactless communication medium.

According to the seventh aspect, the contactless communication medium can store, with the character information storage means, character information concerning the commodity, and can transmit, with the character information transmission means, the character information concerning the commodity to the data communications device when the data communications device approaches. Also, the data communications device can receive, with the character information reception means, the character information concerning the commodity transmitted from the contactless communication medium.

Furthermore, an eighth aspect of the invention is characterized in that, in the image generation system of the seventh aspect, the data communications device is equipped with character information display means for displaying the received character information concerning the commodity. According to such a structure, the data communications device can display, with the character information display means, the received character information concerning the commodity.

Furthermore, a ninth aspect of the invention is characterized in that, in the image generation system of the seventh or eighth aspects, the data communications device is equipped with character information output means for outputting the received character information concerning the commodity to the image generation device, and the image generation device is equipped with character information display means for displaying character information concerning the commodity outputted from the data communications device.

According to the ninth aspect, the data communications device can output, with the character information output means, the received character information concerning the commodity to the image generation device. Also, and the image generation device can display, with the character information display means, the character information concerning the commodity outputted from the data communications device.

It is noted here that character information concerning commodities refers to, for example, names, brand names, features (appealing points), materials, notes in handling (selection method, heatproof temperature, etc.), sizes, and prices of the commodities.

According to the image generation system of the seventh through ninth aspects described above, the customer can obtain an image including the use state of the commodity as well as information of the commodity such as clarification of the commodity, price, and the like. Therefore, the customer can consider the purchase of commodities based on these image and character information.

Furthermore, a tenth aspect of the invention is characterized in that, in the image generation system in any of the preceding nine aspects, the data communications device is a portable terminal. As the portable terminal, a card communication device that can read and rewrite image information recorded in a communication medium, and a cellular phone, PDA and the like having such a function can be enumerated. According to the image generation system of the tenth aspect, the customer may carry the portable terminal; and by bringing the portable terminal close to a contactless communication medium corresponding to an arbitrary commodity among a plurality of commodities, image information or identification information of the commodity can be inputted in the portable terminal.

Furthermore, an eleventh aspect of the invention is characterized in that, in the image generation system of any one of the preceding ten aspects, the image generation device is installed in the shop. According to the image generation system of the eleventh aspect, the customer can see an image including the use state of the commodity within the shop, and can consider the purchase of the commodity based on the image and actual commodities offered at the shop.

Furthermore, a twelfth aspect of the invention pertains to a contactless communication medium applicable to the image generation system of the first aspect of the invention, and comprises image information storage means for storing image information of the commodity; and image information transmission means for transmitting the image information of the commodity to the data communications device when the data communications device approaches. The twelfth aspect of the invention is a contactless communication medium that is applicable to and has action and effect that are similar to the first aspect of the invention.

Moreover, a thirteenth aspect of the invention pertains to a contactless communication medium applicable to the image generation system of the second or third aspects, and comprises identification information storage means for storing identification information of the commodity; and identification information transmission means for transmitting the identification information of the commodity to the data communications device when the data communications device approaches. The thirteenth aspect is a contactless communication medium that is applicable to the first aspect, and its action and effect are similar to that of the second aspect.

Moreover, a fourteenth aspect of the invention pertains to a method for selling commodities at a shop that provides at least one commodity. The method comprises matching the contactless communication medium of the twelfth or thirteenth aspects of the invention to an arbitrary commodity; and storing identification information of the arbitrary commodity in the corresponding contactless communication medium. According to the fourteenth aspect, the image generation system in one of the first three aspects can be applied to a method for selling commodities.

According to the fourteenth aspect of the invention, customers can actually see and/or touch by hand a plurality of commodities offered at shops, and can obtain image information of only preferred commodities from among them. Then, the customers can consider the purchase of commodities based on the actual commodities offered at the shops and images including the use state of the commodities. On the other hand, suppliers (shops) can recommend the customers the purchase of commodities in conformity with the actual human procedure of selecting commodities.

Furthermore, a a fifteenth aspect of the invention pertains to a complex store formed from a plurality of shops that provide commodities of different kinds, and is characterized in that contactless communication mediums corresponds to the commodities offered at the plurality of shops composing the complex store, respectively, and each of the contactless communication mediums is the contactless communication medium of the twelfth or thirteenth aspect of the invention. According to such a structure, the image generation system of one of the first three aspects of the invention can be applied to a complex store formed from an aggregation of multiple shops that offer commodities of different kinds.

According to the fifteenth aspect of the invention, the customer can actually see and/or touch by hand commodities of different kinds (such as, for example, pairs of glasses and sunglasses offered at a glasses shop, shirts and pairs of trousers offered at a dress shop, shoes offered at a shoe shop, and the like), and can obtain image information of only preferred commodities from among them. Then, the customer can consider the purchase of commodities based on the actual commodities offered at the plural shops composing the complex store and images including the use state of the commodities. On the other hand, suppliers (shops) can recommend the customer the purchase of commodities in conformity with the actual human procedure of selecting commodities.

DETAILED DESCRIPTION OF THE INVENTION

Image generation systems, contactless communication mediums, methods for selling commodities, and complex stores in accordance with embodiments of the present invention are described below with reference to the accompanying drawings.

(1) First Embodiment

Figure 1:
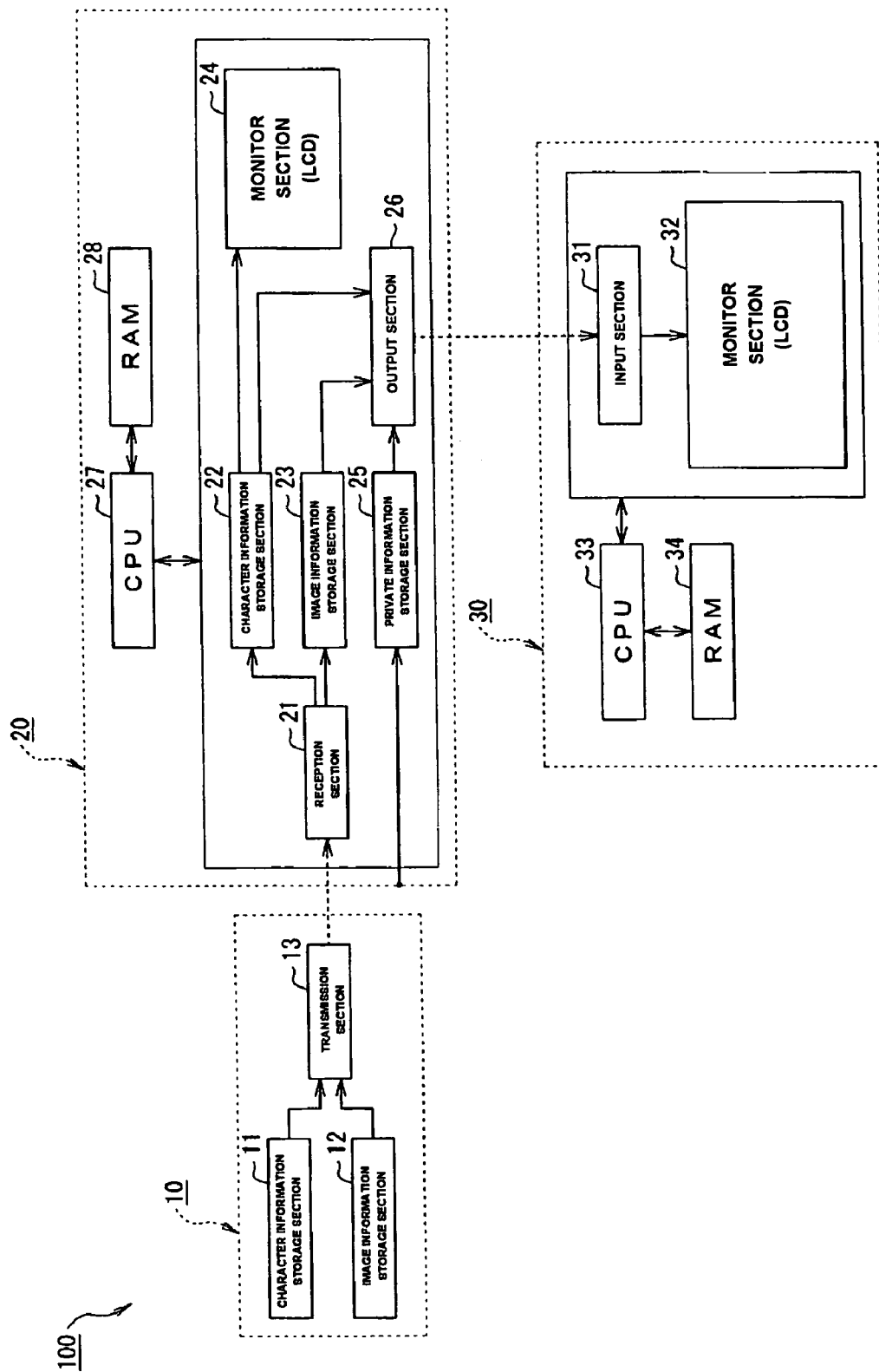
FIG. 1 is a block diagram of an image generation system in accordance with a first embodiment of the present invention.

FIG. 1 is a block diagram showing an exemplary structure of an image generation system 100 in accordance with a first embodiment of the present invention. For example, the image generation system 100 is a system that allows a customer to select at least one commodity from among numerous commodities sold in a complex store formed from an aggregation of multiple shops that offer commodities of different kinds, and generates a synthesized image showing the customer as if she/he tried on the selected commodity (in other words, a try-on image in a virtual space). As shown in FIG. 1, the image generation system 100 includes a contactless identification tag (hereafter simply referred to as a "tag") 10, a portable terminal 20, and an image generation device 30.

The tag 10 adopts, for example, an inductive coupling system that uses mutual induction of coils by alternating magnetic filed, to communicate with the portable terminal 20, and its access method is, for example, in a single access mode. As shown in FIG. 1, the tag 10 is formed from a character information storage section 11, an image information storage section 12, and a transmission section 13. The character information storage section 11 has a function to store character information concerning a commodity corresponding to the tag 10. It is noted here that character information concerning commodities refers to, for example, names, brand names, features (appealing points), materials, notes in handling (selection method, heatproof temperature, etc), sizes, and prices of the commodities. The image information storage section 12 has a function to store image information of a commodity corresponding to the tag 10. Further, the transmission section 13 has a function to transmit, to the portable terminal 20, the character information stored in the character information storage section 11 and the image information stored in the image information storage section 12, when the portable terminal 20 approaches the tag 10. In the tag 10, for example, the character information storage section 11 and the image information storage section 12 are flash memories, and may be formed on the same chip.

The portable terminal 20 may be, for example, a cellular phone that has a reading and writing function (hereafter referred to as a "R/W function") with respect to the tag 10, a card equipped with a R/W function, or a PDA equipped with a R/W function. In this example, for example, the portable terminal 20 is a cellular phone that has a R/W function. For example, as shown in FIG. 1, the portable terminal 20 is composed of a reception section 21, a character information storage section 22, an image information storage section 23, a monitor section 24, a private information storage section 25, an output section 26, a CPU (central processing unit) 27, and a RAM (random access memory) 28.

The reception section 21 has a function that receives character information and image information transmitted from the tag 10. Also, the character information storage section 22 has a function that stores information of the commodity transmitted from the tag 10. The image information storage section 23 has a function that stores image information of the commodity transmitted from the tag 10. The monitor section 24 is, for example, a LCD (liquid crystal display). For example, the name, the model number, etc. of the commodity whose image information is stored in the image information storage section 23 are displayed in the monitor section 24.

The private information storage section 25 has a function that stores private information of the user (which is meant to be here the person who schedules the purchase of merchandise, and hereafter, referred to as the "customer") who carries around this portable terminal 20. Private information may be, for example, image information concerning the appearance of a customer, such as, her/his face, height, body lines, etc., layout information of the house where a customer resides, and the like. Here, the private information stored in the private information storage section 25 is, for example, image information concerning the appearance of the customer.

A CPU 27 has a function that controls the operation and the whole portable terminal 20 based on control programs. A RAM 28 stores control programs of the CPU 27 in its predetermined region in advance. An output section 26 includes an interface (hereafter referred to as an "I/F") circuit, and has a function that transmits data to the image generation device 30. The CPU 27 is connected through signal lines for data transmission with the reception section 21, the character information storage section 22, the image information storage section 23, the monitor section 24, the private information storage section 25, and the output section 26, in a manner that can mutually send and receive data. Upon receiving a control signal, all of the character information stored in the character information storage section 22, the image information stored in the image information storage section 23 and the private information stored in the private information storage section 25 are sent from the respective storage sections 22, 23 and 25 to the output section 26, and outputted from the output section 26 to the image generation device 30.

The image generation device 30 is a device that generates a try-on image of a commodity based on the image information of the commodity outputted from the output section 26 of the portable terminal 20 and the private information. As shown in FIG. 1, the image generation device 30 is composed of an input section 31, a monitor section 32, a CPU 33, and a RAM 34. The input section 31 includes an I/F circuit, and has a function that receives the character information of the commodity, the image information, and the private information outputted from the portable terminal 20. The monitor section 32 is, for example, an LCD. Furthermore, the CPU 33 has a function that controls the operation and the entire image generation device 30 based on control programs. The RAM 34 stores the control programs of the CPU 33 in a prescribed area in advance.

The CPU 33 is connected with the input section 31 and the monitor section 32 through signal lines for data transmission in a manner that can mutually send and receive data. This CPU 33 has functions to take in the image information of the commodity and the private information outputted from the portable terminal 20, and to create, by an image synthesizing technology based on the image information and the private information delivered, a try-on image showing the customer as if she/he tried on the commodity. Also, the CPU 33 has a function to display the generated try-on image on the monitor section 32.

Figure 2:
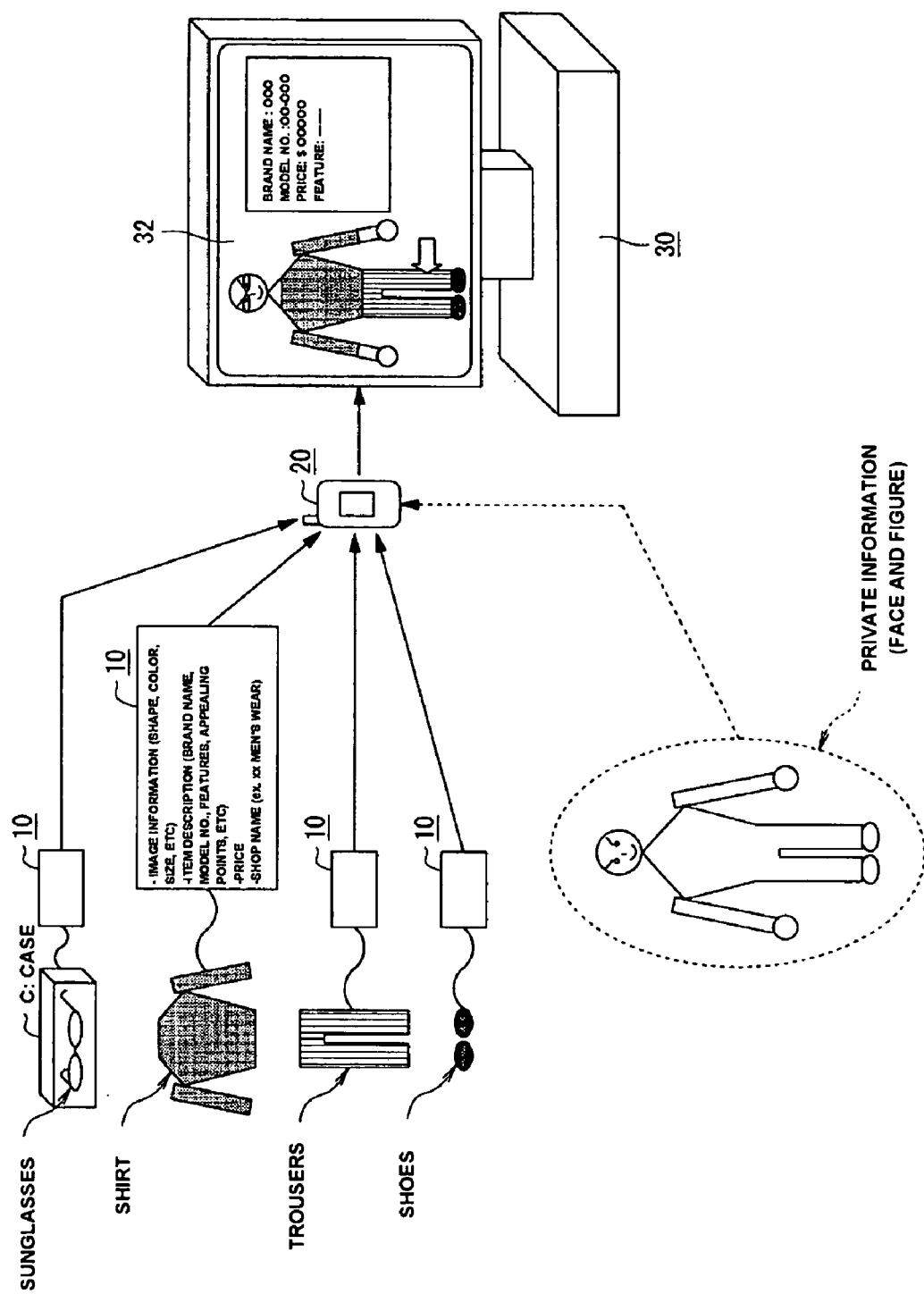
FIG. 2 is a diagram of an application example of the image generation system of FIG. 1.
Figure 3:
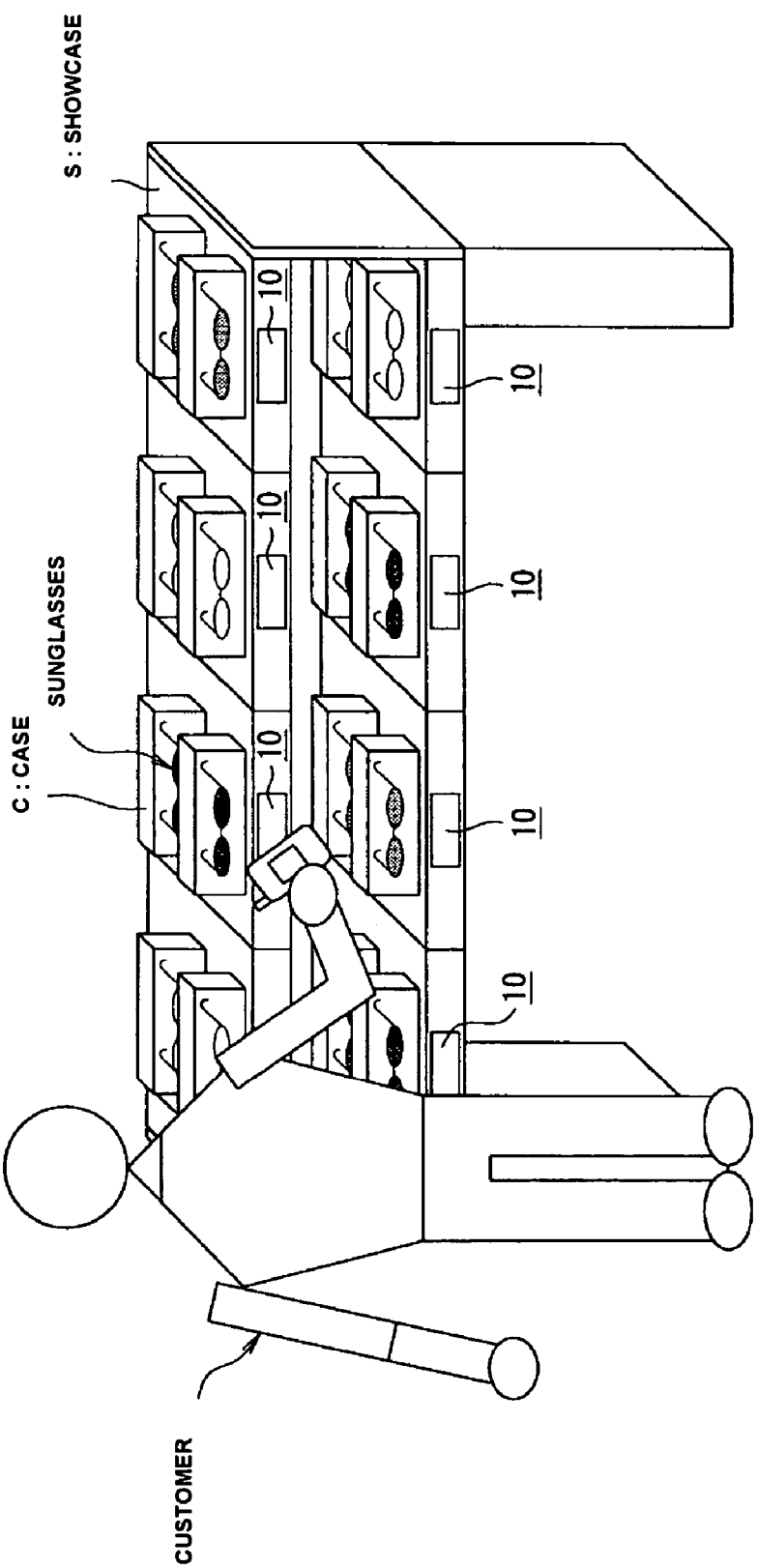
FIG. 3 is a diagram of a second application example of the image generation system of FIG. 1.

Next, a method for selling commodities by using the image generation system 100 described above is described. FIG. 2 and FIG. 3 are conceptual diagrams (1 and 2) that show application examples of the image generation system 100. Here, descriptions are made as to the case where the method for selling commodities that uses the image generation system 100 is applied to a complex store including a plurality of specialty stores that handle different kinds of commodities, such as, an eyeglasses shop, a dress shop, a shoe shop and the like, as tenants.

Employees (hereafter referred to as "clerks") of each of the tenants attach tags 10 individually on commodities, respectively, as shown in FIG. 2. It is noted here that, when it is difficult to attach tags 10 directly to commodities, like sunglasses, the tags 10 may be attached to cases C for storing the commodities, or to a showcase S in which commodities are arranged. Also, a shop that handles many commodities of the same kinds may prepare, for multiple commodities of each of the same model numbers, each one tag 10 associating with the model number, as shown in FIG. 3. At the same time when attaching the tag 10, or before or after, the clerk has character information and image information concerning the commodity stored in the tag 10 corresponding to the commodity. This work can be performed with a data communication device having a R/W function. By this work, the character information concerning the commodity is stored in the character information storage section 11 (see FIG. 1), and image information of the commodity is stored in the image information storage section 12 (see FIG. 1).

In the meantime, the customer inputs image information concerning her/his face and figure, such as, face, height, body lines, etc. (private information) in the portable terminal 20 before she/he goes to the complex store for shopping. Also, the customer takes a picture of her/his appearance with a digital camera or the like at this time with her/his own clothes and accessories on, and may input the image information in the portable terminal 20 as private information.

Figure 4:
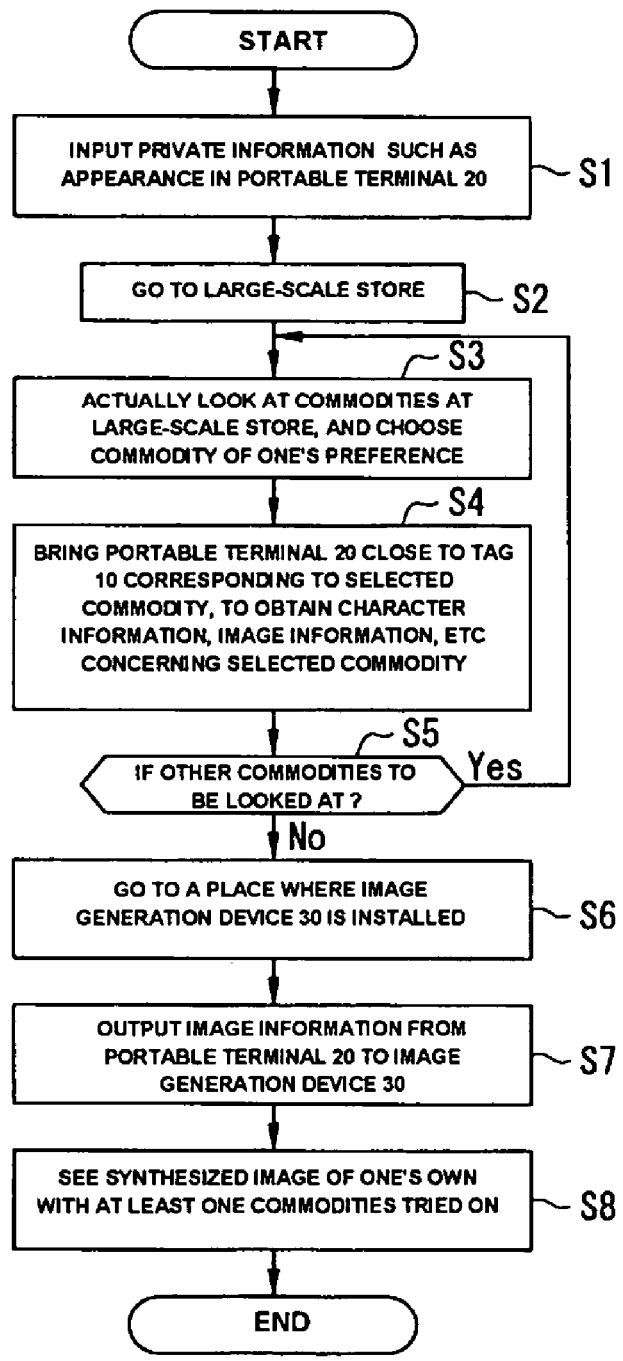
FIG. 4 is a flow chart of a method according to the invention for generating an image by the customer.

FIG. 4 is a flow chart that shows the method for generating an image by the customer. The customer inputs her/his private information to the portable terminal 20 with a personal computer or the like in step S1 of FIG. 4, as described above. The inputted private information is stored in the private information storage section 25 (see FIG. 1). Next, in step S2, the customer goes to the complex store with the portable terminal 20 that stores the private information. Next, in step S3, the customer actually looks at and/or touches by hand commodities in the complex store, and selects a commodity of her/his preference from among them. In this example, it is assumed that the customer goes to a glasses shop in the complex store, and selects a specific pair of sunglasses from among many pairs of glasses and sunglasses exhibited. Then, the process proceeds to step S4 of FIG. 4.

In this step S4, the customer brings the portable terminal 20 close to the tag 10 corresponding to the selected pair of sunglasses, and takes character information and image information concerning this pair of sunglasses into the portable terminal 20, as shown in FIG. 3. As a result, the character information of the selected pair of sunglasses is stored in the character information storage section 22 (see FIG. 1) of the portable terminal 20, and the image information is stored in the image information storage section 23 (see FIG. 1). Next, the process proceeds to step S5 in FIG. 4.

In step S5, the customer selects whether to see other commodities besides the specific pair of sunglasses described above. It is noted here that the other commodities may be other pairs of sunglasses exhibited in the glasses shop, or commodities in shops other than the glasses shop, for example, shirts in a dress shop. When the customer thinks, "I want to go out of the glasses shop in the complex store, and to choose a shirt in a dress shop in this complex store," the process goes back to step S3. On the other hand, when the client thinks, "I have already selected enough merchandise," the process proceeds to step S5 of FIG. 4. In this manner, the steps S3 through S5 in FIG. 4 may be conducted once or two times or more, and character information and image information of one commodity or two or more commodities are obtained.

In here, for example, the steps S3 through S5 in FIG. 4 are repeated four times, and character information and image information of the pair of sunglasses shown in FIG. 2, a shirt, a pair of trousers and a pair of shoes are taken into the portable terminal 20. A list of the commodities taken can be displayed, for example, on the monitor section 24 of the portable terminal 20 (see FIG. 1) as character information. Then, the process proceeds to step S6 in FIG. 4.

In step S6, the customer goes to a location in the complex store where the image generation device 30 is set up. Then, in step S7 of FIG. 4, the portable terminal 20 is set in the image generation device 30, and the character information, the image information and the private information taken into portable terminal 20 are outputted from the portable terminal 20 to the image generation device 30. This outputted information is sent from the input section 31 (see FIG. 1) to the CPU 33 (see FIG. 1) of the image generation device 30.

Then, the CPU 33 creates a try-on image of the customer indicating the state in which she/he tries on all of the commodities, based on the image information of all of the commodities chosen by the customer and the private information such as the face and figure of the customer, by using an image synthesizing technology, and has them displayed on the monitor section 32, as shown in FIG. 2. In step S8 of FIG. 4, the customer considers the purchase of any of the commodities of her/his preference while looking at the try-on image displayed on the monitor section 32. The try-on image can be displayed not only in a state showing its front side as indicated in FIG. 2, but also in states angled with respect to the front side, such as, for example, its side view, rear view, diagonally angled view, or the like.

Moreover, the monitor section 32 can display the title, brand name, model number, features (appealing points), material, handling note (selection method, heatproof temperature, etc), size, price, etc. of each of the commodities, and therefore these character information can be used as judging materials to purchase commodities. For example, a cursor may be displayed in the monitor section 32 as shown in FIG. 2. By moving the cursor, for example, to the pair of trousers, the customer can have the character information of this pair of trousers display in the monitor section 32.

According to the image generation system 100 in accordance with the first embodiment of the present invention, the tag 10 can store image information and character information of a commodity, and can transmits the image information and the character information to the portable terminal 20 when the portable terminal 20 approaches. The portable terminal 20 can receive the image information and the character information of the commodity transmitted from the tag 10, and can output the image information and the character information of the commodity received to the image generation device 30.

Also, the portable terminal 20 can store private information such as the face and figure, and output this private information to the image generation device 30. The image generation device 30 can generate a try-on image based on the image information of the commodity and the private information such as the face and figure outputted from the portable terminal 20, and can display the try-on image generated and character information of the commodity in the monitor section 32.

According to the image generation system 100, or a method of selling commodities and a complex store using the image generation system 100, users (customers) of the system actually look at and/or touch by hand a plurality of commodities (sunglasses, shirts, pairs of trousers, shoes, etc.) offered in the complex store, and can obtain image information of only those of the commodities of their preference from among them. Accordingly, the customers can consider the purchase of commodities based on actual commodities offered at the stores and try-on images generated by an image synthesizing technology.

Compared to the conventional method described in Japanese Laid-open patent 2001-283085, customers look at and/or touch by hand actual commodities offered at shops, and affirm the color, feeling, etc. of them, before seeing try-on images. Therefore, the customers can image their appearance when they try on commodities of their preference with a stronger sense of reality.

Also, when image information representative of a state in which a customer puts on her/his own clothes and accessories has been input in the portable terminal 20 as private information, the customer can image with a stronger sense of reality if a commodity of her/his preference fits to her/his own clothes and accessories from the viewpoint of, for example, colors, feeling, designs and the like of the commodity. On the other hand, suppliers (glasses shops, dress shops, shoe shops, etc. in a complex store) can recommend the customers the purchase of commodities in conformity with the actual human procedure of selecting commodities.

After seeing a try-on image generated by this image generation system 100, the customer can actually try them on in the store (in other words, a try-on in the real space), by using this try-on image as a reference. In the try-on at this stage, the customer has actually affirmed the colors, feeling, and the like of the commodity, and has seen the try-on image, such that the customer can more readily find a commodity that is closer to her/his image without repeating try-on so often in the real space.

In the first embodiment, the image generation system 100 corresponds to the first, fourth through twelfth, and fourteenth aspects of the invention discussed in the Summary of the Invention above. Also, the tag 10 corresponds to the contactless communication medium of the present invention, and the portable terminal 20 corresponds to the data communication means of the present invention. The image generation device 30 corresponds to the image generation device of the present invention. Also, the image information storage section 12 corresponds to the image information storage means of the present invention, and the character information storage section 11 corresponds to the character information storage means of the present invention. Further, the transmission section 13 corresponds to the image information transmission means and the character information transmission means of the present invention. Moreover, the reception section 21 corresponds to the image information reception means and the character information reception means of the present invention. The output section 26 corresponds to the image information output means, the application object image output means, and the character information output means of the present invention. Further, the private information storage section 25 corresponds to the application object image storage means of the present invention, and the monitor section 24 corresponds to the character information display means of the present invention. Also, the CPU 33 corresponds to the image generation means of the present invention, and the monitor section 32 corresponds to the image display means of the present invention.

(2) Second Embodiment

In the first embodiment described above, a method to store, in a tag, image information of a commodity corresponding to the tag is described. However, instead of image information of the commodity, identification information of the commodity may be stored in the tag.

Figure 5:
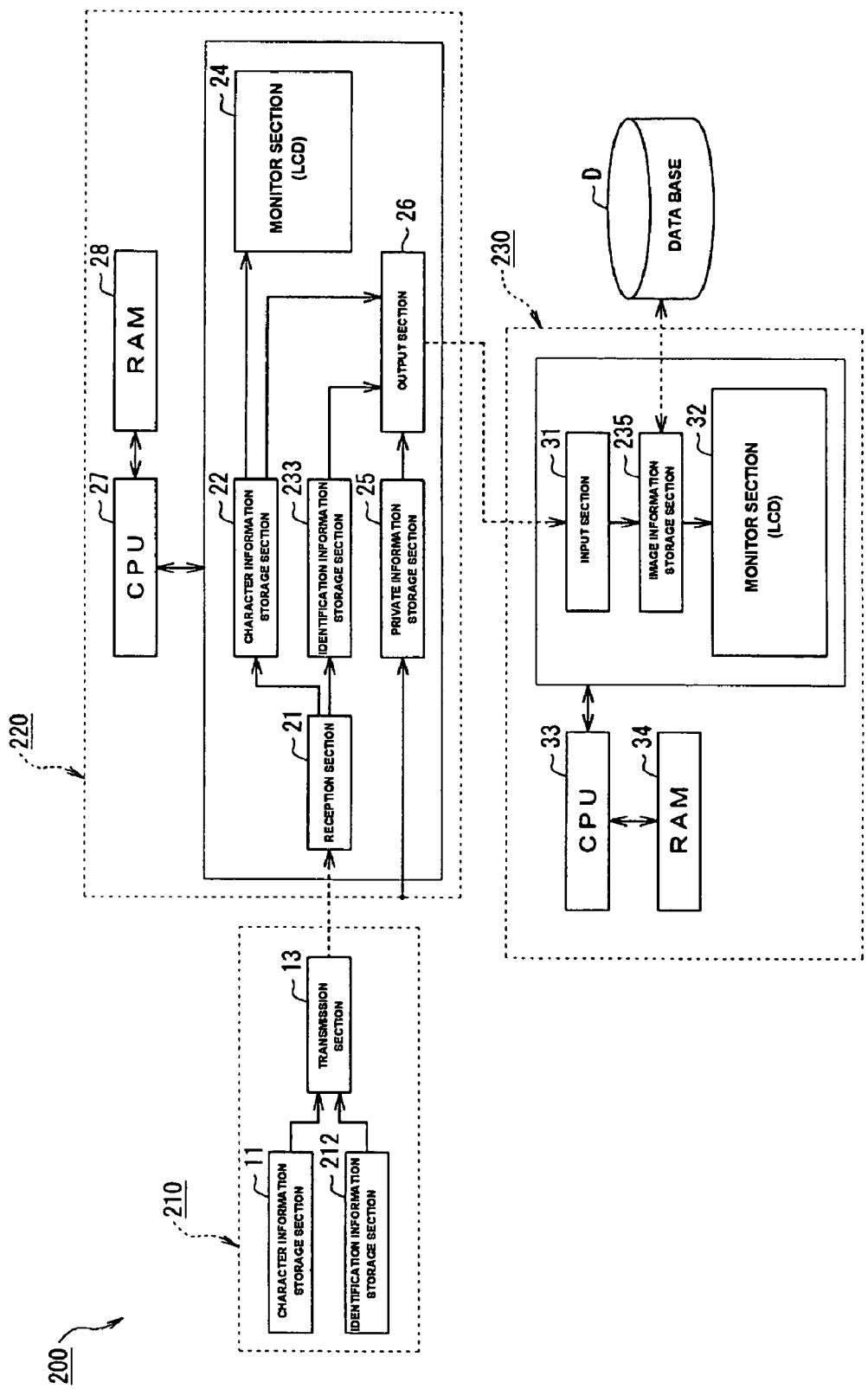
FIG. 5 is a block diagram of an image generation system in accordance with a second embodiment of the present invention.

FIG. 5 is a block diagram showing an exemplary structure of an image generation system 200 in accordance with a second embodiment of the present invention. For example, like the image generation system 100 described in the first embodiment, the image generation system 200 is a system that allows a customer to select at least one commodity from among numerous commodities sold in a complex store, and generates a synthesized image showing the customer as if she/he tried the selected commodity on. Components shown in FIG. 5 having similar functions as those shown in FIG. 1 are appended with the same reference numbers, and their detailed description is omitted.

As shown in FIG. 5, the image generation system 200 includes a tag 210, a portable terminal 220, and an image generation device 230. The tag 210 indicated in FIG. 5 adopts, for example, an inductive coupling system, like the tag 10 indicated in FIG. 1, and its access method is in a single access mode. The tag 210 is composed of, for example, a character information storage section 11, an identification information storage section 212, and a transmission section 13. Among the aforementioned sections, the identification information storage section 212 has a function that stores identification information of a commodity corresponding to the tag 210.

In this tag 210, for example, the character information storage section 11 and the identification information storage section 212 are flash memories, and they are formed on the same chip. Also, the transmission section 13 has a function that transmits character information stored in the character information storage section 11 and identification information stored in the identification information storage section 212 to the portable terminal 220 when the portable terminal 220 approaches the tag 210.

Also, the portable terminal 220 indicated in FIG. 5 may be, like the portable terminal 20 indicated in FIG. 1, for example, a portable telephone equipped with a R/W function to the tag 210, or a card equipped with the same function. For example, the portable terminal 220 is composed of a reception section 21, a character information storage section 22, an identification information storage section 223, a monitor section 24, a private information storage section 25, an output section 26, a CPU 27, and a RAM 28.

Among them, the reception section 21 has a function that receives character information and identification information transmitted from the tag 210. Also, the identification information storage section 223 has a function that stores the identification information of the commodity transmitted from the tag 210. Further, the output section 26 includes an I/F circuit, and has a function to output the character information stored in the character information storage section 22, the identification information stored in the identification information storage section 223, and the private information stored in the private information storage section 25 to the image generation device 230.

The image generation device 230 shown in FIG. 5 is a device that obtains, based on identification information of a commodity outputted from the output section 26 of the portable terminal 220, image information of the commodity, and generates a try-on image of the commodity based on the obtained image information and the private information outputted from the portable terminal 220. As shown in FIG. 5, the image generation device 230 is composed of an input section 31, an image information conversion section 235, a monitor section 32, a CPU 33, and a RAM 34.

Among these sections, the input section 31 includes an I/F circuit, and has a function that receives the character information of the commodity, the identification information, and the private information outputted from the portable terminal 20. The image information conversion section 235 has a function that sends the identification information received at the input section 31 to a data base D, and receives image information corresponding to the identification information (in other words, image information of the commodity corresponding to the tag 210) under the control of the CPU 33.

It is noted here that the data base D may be, for example, a network server connected with the image generation device 230 through a telecommunication line, an optical disk readable by the image generation device 230, or the like. Optical disks that store image information of commodities may be distributed, for example, from shops that sell the commodities with charge or free of charge.

The CPU 33 is connected in a mutually data-communicatable manner with the input section 31, the image information conversion section 235, and the monitor section 32 through signal lines for data transmission. The CPU 33 has a function that generates a try-on image showing a state in which the customer tries the commodity on by an image synthesizing technology, based on the image information of the commodity acquired from the data base D based on the identification information, and the private information acquired from the portable terminal 220, and also a function to have the monitor section 32 display the try-on image.

When commodities are sold by using the image generation system 200 described above, clerks of each of the tenants attach tags 210 individually on commodities that are handled by the respective tenant, as shown in FIG. 2. It goes without saying that the tags 210 associated with the commodities may be attached to cases C for storing the commodities, or to a showcase S in which the commodities are arranged, as described in the first embodiment. Then, the clerk has character information and identification information concerning the commodity stored in the tag 210 corresponding to the commodity, by using a data communications device with a R/W function. By this work, the character information concerning the commodity is stored in the character information storage section 11 (see FIG. 5), and identification information of the commodity is stored in the identification information storage section 212 (see FIG. 5).

On the other hand, the customer reads the identification information of the commodity corresponding to the tag 210 from the tag 210 with the portable terminal 220. Then, the identification information read is inputted to the image generation device 230, and for example, image information of the commodity corresponding to the tag 210 is downloaded from the Internet.

In this manner, by the image generation system 200 in accordance with the second embodiment of the present invention, the tag 210 can store the identification information and the character information of the commodity, and can transmit the identification information and the character information of the commodity to the portable terminal 220, when the portable terminal 220 approaches. The portable terminal 220 can receive the identification information and the character information of the commodity transmitted from the tag 210, and can output the received identification information and the character information of the commodity to the image generation device 230. Moreover, the portable terminal 220 can store private information such as the face and figure and the like, and can output the private information to the image generation device 230.

The image generation device 230 can transmit the identification information of the commodity outputted from the portable terminal 20 to the data base D, and acquire image information of this commodity. The image generation device 230 can generate a try-on image based on the image information of the commodity acquired from the data base D and the image information including the face and figure acquired from the portable terminal 220, and can display the generated try-on image and the character information of the commodity on the monitor section.

According to the image generation system 200, or a method of selling commodities and a complex store using the image generation system 200, customers can actually look at and/or touch by hand pairs of sunglasses, shirts, pairs of trousers, shoes, and the like offered in the complex store, and can obtain image information of only those of the commodities of their preference from among them. Accordingly, the customers can consider the purchase of commodities based on actual commodities offered at the store and try-on images generated by an image synthesizing technology.

Compared to the conventional method described in Japanese Laid-open patent 2001-283085, the customers look at and/or touch by hand actual commodities offered at shops, and affirm the color, feeling, etc. of them, before seeing try-on images. Therefore, the customers can image their appearance when they try on commodities of their preference with a stronger sense of reality. On the other hand, suppliers (glasses shops, dress shops, shoe shops, etc. in a complex store) can recommend the customers the purchase of commodities in conformity with the actual human procedure of selecting commodities.

Also, compared to the first embodiment, because the volume of information to be stored in the tag 210 can be reduced, the time required for transferring information between the tag 210 and the portable terminal 220 can be shortened.

In accordance with the second embodiment, the image generation system 200 corresponds to the image generation system recited in any one of the second, fourth through eleventh, thirteenth and fifteenth aspects of the invention discussed in the Summary of the Invention above. Also, the tag 210 corresponds to the contactless communication medium of the present invention, and the portable terminal 220 corresponds to the data communication means of the present invention. The image generation device 230 corresponds to the image generation device of the present invention. Also, the identification information storage section 212 corresponds to the identification information storage means of the present invention, and the character information storage section 11 corresponds to the character information storage means of the present invention. Further, the transmission section 13 corresponds to the image information transmission means and the character information transmission means of the present invention. Moreover, the reception section 21 corresponds to the identification information reception means and the character information reception means of the present invention. The output section 26 corresponds to the identification information output means, the application object image output means, and the character information output means of the present invention. Further, the private information storage section 25 corresponds to the application object image storage means of the present invention, and the monitor section 24 corresponds to the character information display means of the present invention. Also, the CPU 33 corresponds to the image generation means of the present invention, and the monitor section 32 corresponds to the image display means of the present invention.

Figure 6:
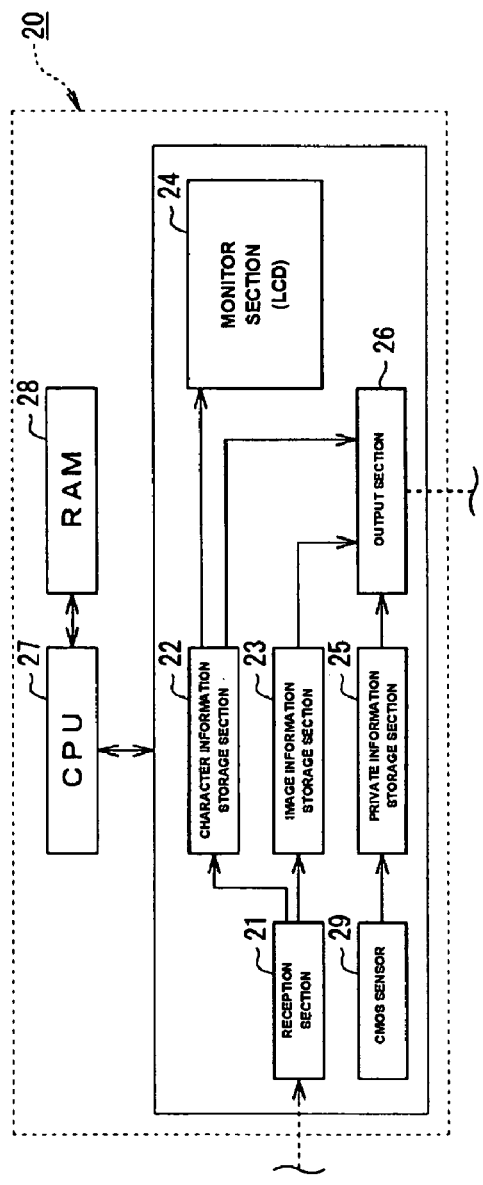
FIGS. 6(A) and 6(B) are block diagrams of exemplary portable terminals according to the present invention.
Figure 6:
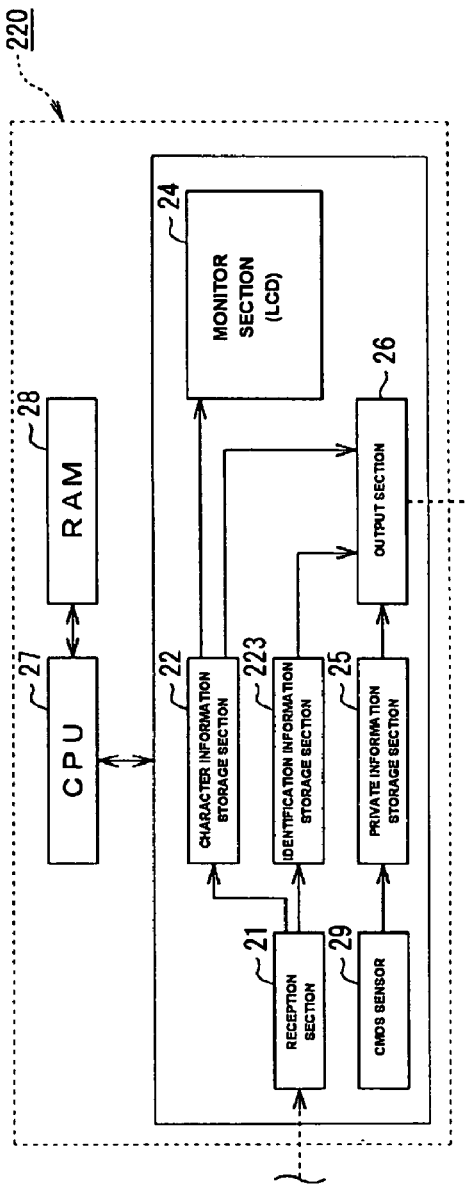

As shown in FIGS. 6(A) and (B), by installing an imaging device such as a CCD camera, CMOS sensor 29 or the like to the portable terminal 20, 220, for example, a self-image can be taken by the CMOS sensor 29. According to such a structure, private information such as the face and figure of her/his can be taken directly in the portable terminal 20, 220, and therefore acquisition of private information becomes easy and convenient. In this case, the CMOS sensor 29 corresponds to the application object image information obtaining means of the present invention.

(3) Third Embodiment

In the second embodiment described above, the case where the image generation device 230 that receives identification information of a commodity acquires image information of the commodity based on this identification information is described. However, the present invention may be structured such that, instead of an image generation device, a portable terminal may obtain image information of a commodity based on identification information received from a tag.

Figure 7:
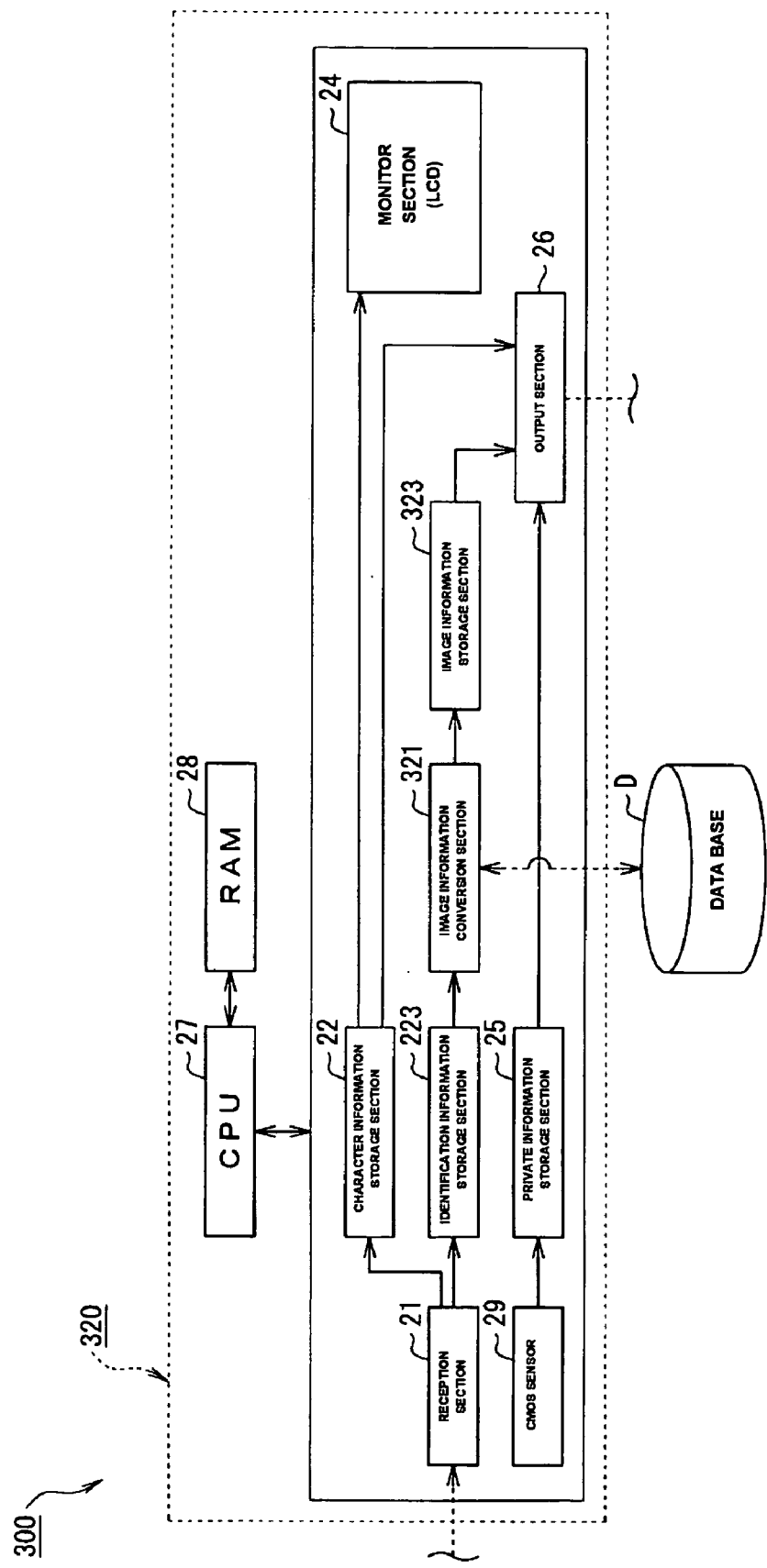
FIG. 7 is a block diagram of an image generation system in accordance with a third embodiment of the present invention.

FIG. 7 is a block diagram that shows an exemplary structure of an image generation system 300 in accordance with a third embodiment of the present invention. Like the image generation systems 100 and 200 described in the first and second embodiments, for example, the image generation system 300 is a system that allows the customer to select at least one commodity from among numerous commodities sold in a complex store, and generates a synthesized image of the customer as if she/he tried the selected commodity on. Components shown in FIG. 7 having similar functions as those shown in FIG. 1, 5, 6 (A) or 6 (B) are appended with the same reference numbers, and their detailed description is omitted.

The image generation system 300 is composed of a tag, a portable terminal and an image generation device. Among them, the tag is the same as the tag 210 of the image generation system 200 (see FIG. 5), and the image generation device is the same as the image generation device 30 of the image generation system 100 (see FIG. 1). Accordingly, FIG. 7 omits illustrations of both of the tag and the image generation device that compose the image generation system 300.

The portable terminal 320 shown in FIG. 7 may be, for example, a portable telephone equipped with a R/W function to the tag, or a card equipped with the same function. For example, the portable terminal 320 is composed of a reception section 21, a character information storage section 22, an identification information storage section 223, an image information conversion section 321, an image information storage section 323, a monitor section 24, a private information storage section 25, an output section 26, a CPU 27, and a RAM 28.

Among them, the image information conversion section 321 has function that sends identification information stored in the identification information storage part 223 to a data base D, and receives image information corresponding to the identification information from the data base D. Transmission and reception of the identification information of the image information conversion section 321 to and from the data base D are performed under the control of the CPU 27. Also, the image information storage section 323 has a function that stores image information of a commodity acquired from the data base D by the image information conversion section 321. In addition, the output section 26 includes an I/F circuit, and has a function that outputs character information stored in the character information storage section 22, image information of a commodity stored in the image information storage section 323, and private information stored in the private information storage section 25 to the image generation device 30 (see FIG. 1).

In this manner, according to the image generation system 300 in accordance with the third embodiment of the present invention, the portable terminal 320 can receive identification information of a commodity transmitted from the tag 210 (see FIG. 5), can obtain image information of the commodity from the data base D based on the identification information of the commodity received, and can output the image information of the commodity obtained to the image generation device 30 (see FIG. 1).

According to the image generation system 300, or a method of selling commodities and a complex store using the image generation system 300, customers can obtain image information of only commodities of their preference from among a plurality of commodities such as pairs of sunglasses, shirts, pairs of trousers, shoes and the like offered in the complex store, just as in the first and second embodiments. Then, the customers can consider the purchase of commodities based on actual commodities offered at the stores and try-on images generated by an image synthesizing technology. Therefore, like the first and second embodiments, the customers can image their appearance when they try on commodities of their preference with a stronger sense of reality. On the other hand, suppliers (glasses shops, dress shops, shoe shops, etc. in a complex store) can recommend the customers the purchase of commodities in conformity with the actual human procedure of selecting commodities.

Also, compared to the first embodiment, the time required for data transmission between the tag 210 and the portable terminal 320 can be shortened.

In the third embodiment, the image generation system 300 corresponds to the image generation system recited in any one of the third through eleventh, thirteenth and fifteenth aspects of the invention discussed in the Summary of the Invention above. Also, the portable terminal 220 corresponds to the data communication device of the present invention, and the reception section 21 corresponds to the identification information reception means and the character information reception means of the present invention. Further, the output section 26 corresponds to the image information output means, the application object image output means, and the character information output means of the present invention. Also, the monitor section 24 corresponds to the character information display means of the present invention, and the image information conversion section 321 corresponds to the image information obtaining device of the present invention.

It is noted that the first, second and third embodiments are described above with reference to articles such as sunglasses, shirts, trousers and shoe as examples of commodities. However, commodities in accordance with the present invention are not limited to articles, and commodities in accordance with the present invention include services such as hair styling, make-ups, and the like. When commodities are beauty services such as nail make-ups, tags may be matched with, for example, storage cases of "nail models having nail make-ups applied thereon."

Commodities in accordance with the present invention are not limited to something that can be put on, but may include pieces of furniture. In this case, a customer can use image information concerning her/his own room as private information, and a synthesized image can be generated based on the private information and the image information of the furniture. According to this structure, the customer can image a state in which a piece of furniture of her/his preference is placed in a room of her/his own with a stronger sense of reality. Moreover, the customer can readily judge from the synthesized image whether or not the furniture can be stored in her/his room without having to compare the size of her/his room with the size of each piece of furniture one by one.

Alternately, for example, commodities of the present invention can be potted plants for gardening. In this case, a customer takes a picture of her/his garden with the CMOS sensor 27 (see FIG. 6(A), FIG. 6(B), and FIG. 7) of the portable terminal, a digital camera, or the like, and uses image information of the photographed garden as private information, and a synthesized image is generated based on the private information and the image information of the potted plants. According to such a structure, the customer can image a state in which potted plants of her/his preference are placed in her/his garden with a stronger sense of reality. Also, the customer can readily judge whether the potted plants of her/his preference fit to the atmosphere, colors, etc. of the garden.

Moreover, the first, second and third embodiments are described above with reference to the cases where the image generation system is applied to complex stores where pairs of glasses, pairs of sunglasses, shirts, pairs of trousers, pairs of shoes and the like are handled. However, application objects of the present invention are not limited to complex stores, and can also be applied, for example, to multiple individual shops such as independent glasses shops, men's wear shops, shoe shops and the like. By applying the image generation system described above to these independent privately owned shops, a "try-on of a combination of plural commodities sold individually at a plurality of privately owned shops" which is difficult in the real space can be realized in a virtual space.

The invention claimed is:

1. An image generation system that generates an image including a use state of at least one commodity offered at a shop, the image generation system comprising:
   a contactless communication medium corresponding to the commodity, a data communications device and an image generation device, wherein
   the contactless communication medium is equipped with image information storage means for storing image information of the commodity, and
   image information transmission means for transmitting the image information of the commodity to the data communications device when the data communications device approaches, the data communications device is equipped with image information reception means for receiving the image information of the commodity transmitted from the contactless communication medium, and image information output means for outputting the received image information of the commodity to the image generation device, and the image generation device is equipped with image generation means for generating an image including the use state of the commodity based on the image information of the commodity outputted from the data communications device, and image display means for displaying the image including the use state of the commodity generated.

2. An image generation system according to claim 1, characterized in that the data communications device is a portable terminal.

3. An image generation system according to claim 1, characterized in that the image generation device is installed in the shop.

4. A contactless communication medium applicable to the image generation system recited in claim 1, the contactless communication medium comprising:

image information storage means for storing image information of the commodity; and image information transmission means for transmitting the image information of the commodity to the data communications device when the data communications device approaches.

5. An image generation system that generates an image including a use state of at least one commodity offered at a shop, the image generation system comprising:

a contactless communication medium corresponding to the commodity, a data communications device and an image generation device connected to a specified data base, wherein the contactless communication medium is equipped with identification information storage means for storing identification information of the commodity, and identification information transmission means for transmitting the identification information of the commodity to the data communications device when the data communications device approaches, the data communications device is equipped with identification information reception means for receiving the identification information of the commodity transmitted from the contactless communication medium, and identification information output means for outputting the received identification information of the commodity to the image generation device, and the image generation device is equipped with image information obtaining means for obtaining image information of the commodity from the data base based on the identification information of the commodity outputted from the data communications device, image generation means for generating an image including the use state of the commodity based on the image information of the commodity obtained, and image display means for displaying the image including the use state of the commodity generated.

6. A contactless communication medium applicable to the image generation system recited in claim 5, the contactless communication medium characterized in comprising:

identification information storage means for storing identification information of the commodity; and identification information transmission means for transmitting the identification information of the commodity to the data communications device when the data communications device approaches.

7. An image generation system that generates an image including a use state of at least one commodity offered at a shop, the image generation system characterized in comprising:

a contactless communication medium corresponding to the commodity, a data communications device and an image generation device connected to a specified data base, wherein the contactless communication medium is equipped with identification information storage means for storing identification information of the commodity, and image information transmission means for transmitting the identification information of the commodity to the data communications device when the data communications device approaches, the data communications device is equipped with identification information reception means for receiving the identification information of the commodity transmitted from the contactless communication medium, image information obtaining means for obtaining image information of the commodity from the data base based on the received identification information of the commodity, and image information output means for outputting the obtained image information of the commodity to the image generation device, and the image generation device is equipped with image generation means for generating an image including the use state of the commodity based on the image information of the commodity outputted from the data communications device, and image display means for displaying the image including the use state of the commodity generated.

8. An image generation system according to claim 3, characterized in that the image generation means generates the image including the use state of the commodity based on the image information of the commodity, and image information of an application object to which the commodity is actually applied.

9. An image generation system according to claim 8, characterized in that the data communications device is equipped with application object image information storage means for storing image information of an application object to which the commodity is actually applied, and application object image output means for outputting the image information of the application object.

10. An image generation system according to claim 9, characterized in that the data communications device is equipped with application object image information obtaining means for obtaining image information of an application object to which the commodity is actually applied.

11. An image generation system according to claim 10, characterized in that the contactless communication medium is equipped with character information storage means for storing character information concerning the commodity, and character information transmission means for transmitting the character information concerning the commodity to the data communications device when the data communications device approaches, and the data communications device is equipped with character information reception means for receiving the character information concerning the commodity transmitted from the contactless communication medium.

12. An image generation system according to claim 11, characterized in that the data communications device is equipped with character information display means for displaying the received character information concerning the commodity.

13. An image generation system according to claim 12, characterized in that the data communications device is equipped with character information output means for outputting the received character information concerning the commodity to the image generation device, and the image generation device is equipped with character information display means for displaying the character information concerning the commodity outputted from the data communications device.

* * * * *